2 Sheets—Sheet 1.

J. J. SWEATT.
Thrasher and Cleaner for Peas, Beans, &c.

No. 212,763. Patented Feb. 25, 1879.

WITNESSES:
Henry N. Miller
C. Sedgwick

INVENTOR:
J. J. Sweatt
BY
ATTORNEYS.

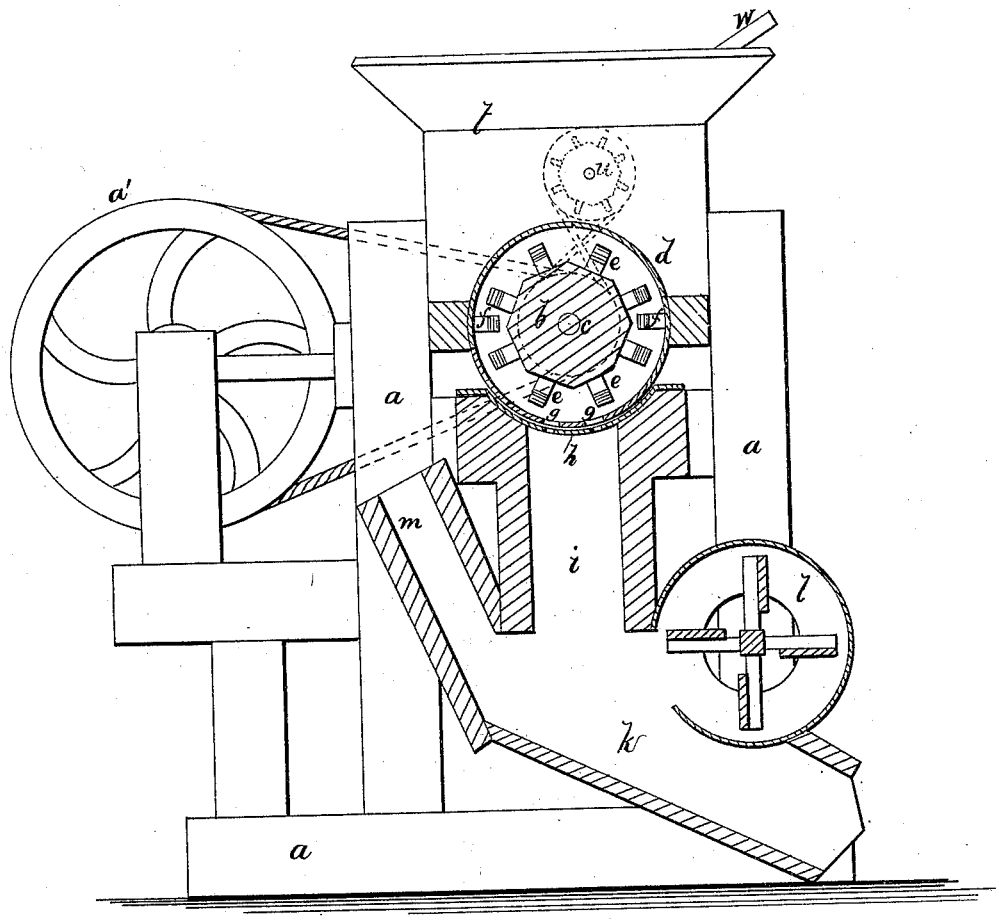

UNITED STATES PATENT OFFICE.

JAMES J. SWEATT, OF CONYERSVILLE, TENNESSEE.

IMPROVEMENT IN THRASHER AND CLEANER FOR PEASE, BEANS, &c.

Specification forming part of Letters Patent No. 212,763, dated February 25, 1879; application filed November 8, 1878.

*To all whom it may concern:*

Be it known that I, JAMES JEFFERSON SWEATT, of Conyersville, in the county of Henry and State of Tennessee, have invented a new and Improved Thrasher and Cleaner for Pease, Beans, &c., of which the following is a specification:

My improvements relate to machines for thrashing pease and seeds and separating them from the pods and other foreign substances.

The invention will first be described in connection with the drawings, and then pointed out in the claims.

Figure 1:
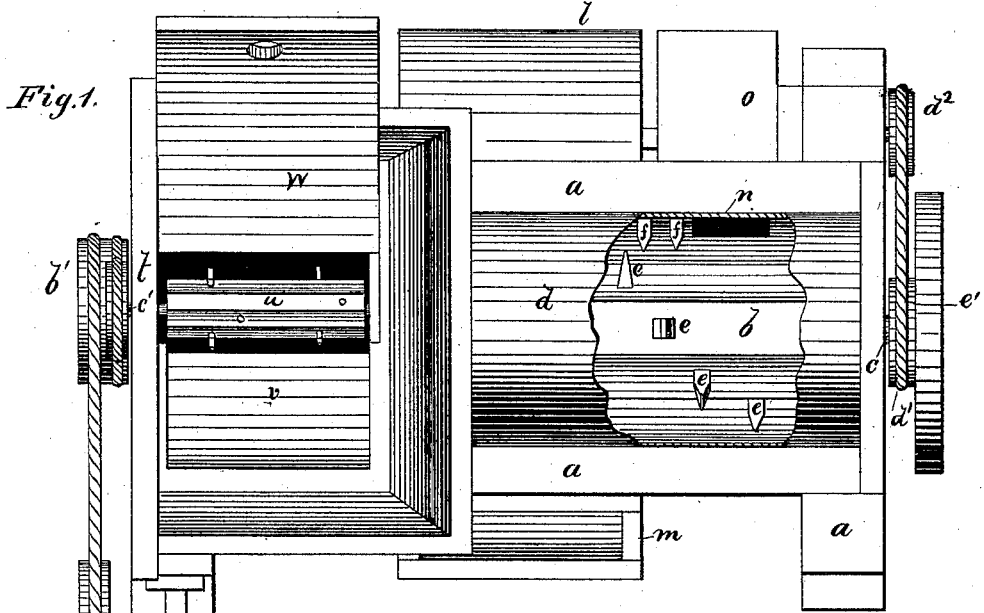
Figure 2:
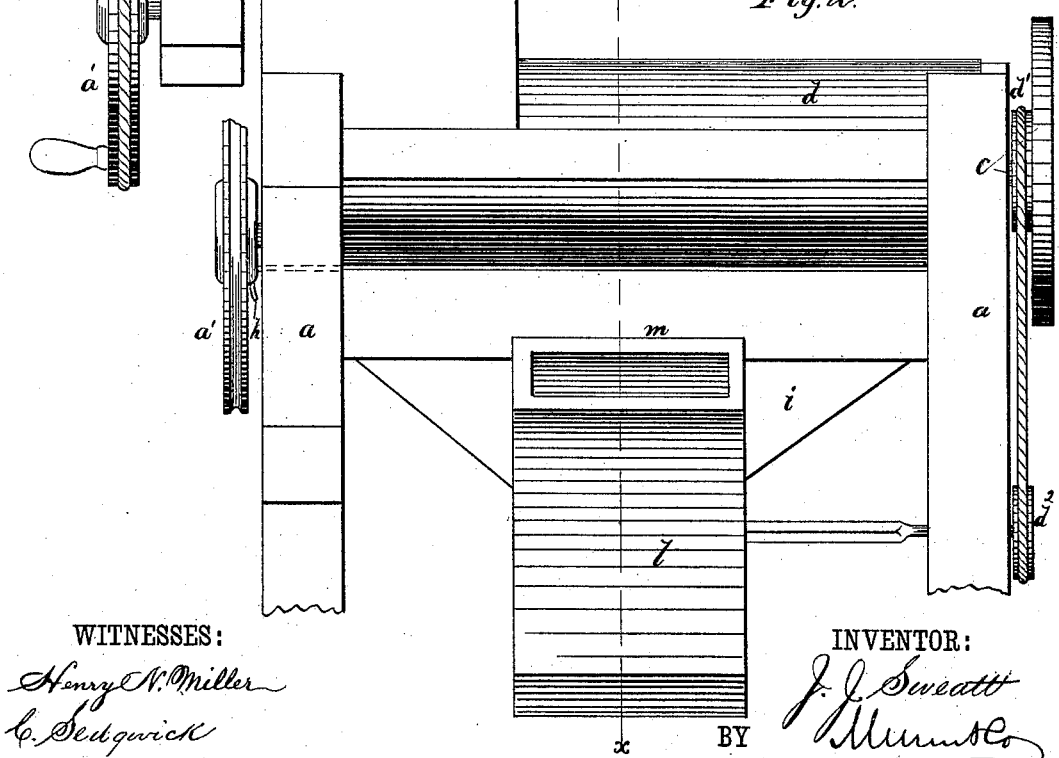

In the accompanying drawings, Figure 1 is a plan view of my machine partially broken open to show the interior. Fig. 2 is a side elevation. Fig. 3 is a cross-section on the line $x\,x$.

Similar letters of reference indicate corresponding parts.

$a\,a$ is the frame-work on which the operative parts of the machine are supported. $b$ is a barrel or solid cylinder on a shaft, $c$, that is journaled on frame $a$, and is surrounded entirely by a sheet-metal casing, $d$, forming a hollow cylinder or thrashing-chamber. The cylinder $b$ has, throughout its length, projecting lugs or teeth $e$, with flat-pointed ends, and arranged in spiral form upon $b$. $f$ are similar teeth projecting from the sides of frame $a$, inside the cylinder $d$, and positioned so that when cylinder $b$ revolves, as hereinafter described, teeth $e$ will pass between teeth $f$.

Along the bottom of cylinder $d$ is a double row of holes, $g$, large enough to permit the passage of any grain or seed which may be thrashed or cleaned by the machine, and adjustable in size by a metal slide, $h$, that is fitted to move upon frame $a$, beneath the openings $g$, to close the openings $g$ entirely, or bring the series of smaller openings in $h$ beneath openings $g$, to adapt the machine for cleaning grain and seeds of different sizes, or to retain the material under treatment as long as desired. The openings $g$ discharge the seed into the vertical pipe $i$, that communicates with the inclined chute $k$, through which they are delivered into a suitable receptacle. At the upper side of chute $k$ is a fan-blower, $l$, opening into $k$, and arranged to discharge a current of air upon the seed or grain as it falls into $k$, so that dust, smut, and other refuse will be blown up and out of the pipe $m$.

At the lower end of the thrashing-chamber $d$ is an opening, $n$, (see Fig. 1,) above the axis of cylinder $b$, through which opening the pods or other refuse that cannot go out at $g$ are discharged and led off by a pipe, $o$. The spiral arrangement of teeth $e$ works the pods toward the opening $n$ and forces them out.

The feeding-hopper $t$ is at the upper end of the machine, and opens directly into the thrashing-chamber. Above the opening is a short cylinder, $u$, upon a shaft journaled in the sides of hopper $t$, and having projecting from its surface a number of teeth, that act upon the pods as they slide down the inclined board $v$, to regulate the supply and partially break them up. The feed is governed by the inclined slide-board $w$, fitted to move in hopper $t$ to and from the board $v$.

To operate the machine, either hand or horse power is to be applied to a crank-wheel, $a'$, that is belted to a pulley, $b'$, on shaft $c$, and a second belt from $b$ goes to pulley $c'$ on the shaft of cylinder $u$. The blower $l$ is driven by a belt from pulley $d^2$ to pulley $d^1$ at the other end of shaft $c$.

This machine is adapted to the thrashing and cleaning of pease and seeds of any size, and also for cleaning wheat and other grain of smut, chaff, and other refuse. It can be made of any suitable size, adapted as a hand or horse power machine. The upper half of cylinder $d$ will be applied so that it can be removed to give access to the interior.

Having thus described my invention, I claim as new and desire to secure by Letters Patent—

1. The combination, with cylinder $d$, having variable openings $g$, of the pipe $i$, chute $k$, fan $l$, and pipe $m$, as and for the purpose specified.

2. In combination with the cylinder $b$ and cylindrical chamber $d$, havings openings $g$, the slide $h$, provided with smaller openings, substantially as and for the purposes set forth.

JAMES JEFFERSON SWEATT.

Witnesses:
 J. F. LAMB,
 JOHN M. HENDERSON.